Patented Dec. 4, 1951

2,577,708

UNITED STATES PATENT OFFICE 2,577,708

ALKYLENEOXY-BENZYL DIAMINODIPHENYL SULFONE

Milton Kosmin, Dayton, Ohio, assignor to Monsanto Chemical Company, St. Louis, Mo., a corporation of Delaware No Drawing. Application November 24, 1948, Serial No. 61,894

4 Claims. (Cl. 260—397.6)

This invention relates to a new family of therapeutic agents having unusual activity in inhibiting the growth of tuberculosis bacteria. More specifically the invention relates to methods of rendering 4,4'-diaminodiphenyl sulfone water soluble, without seriously reducing the effectiveness of the therapeutic agent.

It is known that 4,4'-diaminodiphenyl sulfone is an active agent for controlling tuberculosis bacteria in culture media. Because of its insolubility in water it is not effective when used in contact with living animal tissue. It is also known that 4,4'-diaminodiphenyl sulfone can be converted into water soluble derivatives by substituting hydrophilic radicals on the amino groups, and that some of these derivatives retain some of their therapeutic activity. One such derivative, which is known as "Promin" and is commercially available for the purpose of inhibiting the growth of tuberculosis bacteria, has the structure:

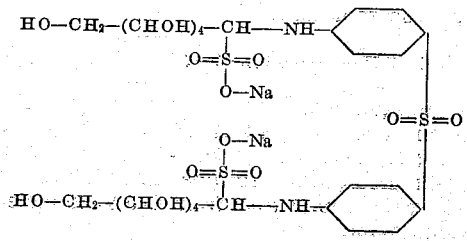

Although this prior art compound is widely used because of its solubility it is much less active than the 4,4'-diaminodiphenyl sulfone.

The primary purpose of this invention is to provide new water soluble derivatives of 4,4'-diaminodiphenyl sulfone which have better bacteristatic activity than commercially available derivatives. A further purpose of the invention is to provide a method of converting 4,4'-diaminodiphenyl sulfone into water soluble derivatives without seriously imparing the therapeutic activity. A still further purpose is to provide new medicinal compounds.

In application Serial No. 61,893, filed concurrently herewith, by Milton Kosmin, now U. S. Patent 2,572,570, there are described and claimed a valuable group of derivatives of 4,4'-diaminodiphenyl sulfone which have unusual inhibitory effects on bacterial growth. Although very useful these derivatives are not as water soluble as is usually desired for optimum practical applications. It has now been found that some slight modification will improve the water solubility without seriously reducing the bacteristatic effect.

The new compositions are prepared from a phenol which has been treated with 5 to 30 moles of ethylene oxide, said phenol may have an alkyl substituent up to eighteen carbons in length. The phenol-ethylene oxide condensation product is chloromethylated by reaction with aqueous formaldehyde and subsequent treatment with hydrochloric acid. The resulting chloromethyl compound is then condensed with 4,4'-diaminodiphenyl sulfone in the presence of a mild alkaline reagent, for example sodium bicarbonate. The products are then separated from the aqueous medium by addition of saturated salt solution and warming to enable the formation of two liquid layers.

The products obtained by condensing the sulfone with the chloromethylated phenyl polyethylene glycol esters are then treated with ethylene oxide to add on from 5 to 30 moles of the ethylene oxide per mole of the sulfone derivative. The reaction is conducted at elevated temperatures, for example 120 to 180° C. in a closed vessel. The reaction is preferably conducted by weighing the initial reaction mass and introducing ethylene oxide into the vessel until the desired proportion has been combined as evidenced by the total weight.

The new chemical compounds are useful in controlling the growth of bacteria and especially in arresting the development of tuberculosis bacteria in animal tissues.

Further details of the preparation and use of the new materials are set forth with respect to the following specific examples.

Example 1

Twenty parts by weight of 37 percent formaldehyde solution was mixed with 60 grams of concentrated hydrochloric acid. The mixture was then cooled to room temperature and 69 parts of isooctyl phenol, which had been treated with 11 moles of ethylene oxide was added slowly over a period of twenty minutes. The mixture was cooled and hydrochloric acid gas was bubbled in slowly with cooling until no further chemical reaction took place as evidenced by the evolution of heat. The resulting clear, colorless solution was then neutralized with sodium bicarbonate, and a viscous liquid product was separated by adding a saturated sodium chloride solution. The separated product was removed and carefully dried. This compound was believed to be the chloromethyl compound:

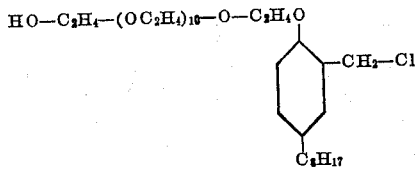

A mixture of 15 grams of water, 5.3 grams of sodium bicarbonate and 12.4 grams of diaminodiphenyl sulfone was prepared and 37 grams of the choloromethyl compound, was added slowly. The mixture was then heated at 90 to 95° C. for four hours. The condensation product was separated out as a second liquid phase by adding a saturated sodium chloride solution and warming the reaction mass. The liquid product which solidified by cooling was the reaction product of equimolecular proportions of the 4,4'-diaminodiphenyl sulfone and the chloromethylated p-isooctylphenyl ether of polyethylene glycol.

The product produced in accordance with the preceding paragraph was charged to an autoclave with 20 moles of ethylene oxide and 0.1 percent of potassium hydroxide to catalyze the reaction. The vessel was maintain at 150 to 160° C. for sixteen hours. The resulting compound was identified as the ethylene oxide addition product of the 4,4'-diaminodiphenyl sulfone derivatives made by condensation with the chloromethylated ethylene oxide adducts, p-isooctyl phenol.

*Example 2*

The bacteristatic effect of the compounds prepared in the preceding example was listed in cultures of *Mycobacterium tuberculosis* H37Rv. Using "Promin" and 4,4'-diaminodiphenyl sulfone as controls, the minimum concentrations required to inhibit the bacterial growth were measured. The control with 4,4'-diaminodiphenyl sulfone was used with diethylene glycol because of its insolubility in water. The following table sets forth the observed minimum concentrations in milligram percent.

"Promin" _____ 65
Compound of Example 1 _____ 0.6
4,4'-diaminodiphenyl sulfone (diethylene glycol) _____ 0.6

The invention is defined by the following claims.

I claim:
1. A reaction product of from five to 30 moles of ethylene oxide and one mole of a product prepared by the reaction of one mole of 4,4'-diaminodiphenyl sulfone with one mole of a product prepared by the reaction of equimolar proportions of formaldehyde, hydrogen chloride, and a compound having the structure:

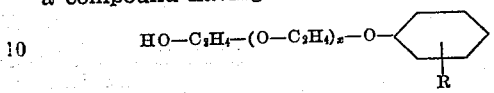

wherein R is an alkyl radical having up to 18 carbon atoms and $x$ is a small whole number from five to 30.

2. A reaction product of from five to 30 moles of ethylene oxide and one mole of a product prepared by the inter-reaction of one mole of 4,4'-diaminodiphenyl sulfone and one mole of a product prepared by the reaction of equimolar proportions of formaldehyde, hydrogen chloride, and a compound having the structure:

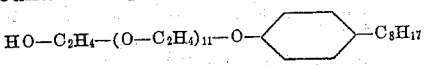

3. A method of preparing a therapeutic compound, which comprises reacting a compound having the structure:

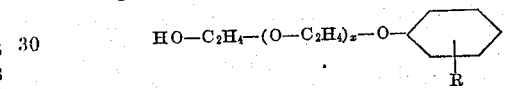

wherein R is an alkyl radical having up to 18 carbon atoms and X is a small whole number from five to 30, with an equimolar proportion of formaldehyde in the presence of an excess of hydrochloric acid, reacting the resulting product with one mole of 4,4'-diaminodiphenyl sulfone, and treating the resulting compound with from five to 30 moles of ethylene oxide.

4. A method of preparing a therapeutic compound, which comprises reacting a compound having the structure:

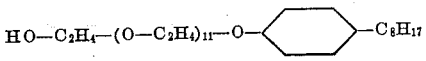

with an equimolar proportion of formaldehyde in the presence of an excess of hydrochloric acid, reacting the resulting product with one mole of 4,4'-diaminodiphenyl sulfone, and treating the resulting compound with from five to 30 moles of ethylene oxide.

MILTON KOSMIN.

No references cited.